(12) United States Patent
Greenhalgh

(10) Patent No.: US 9,477,479 B2
(45) Date of Patent: Oct. 25, 2016

(54) INSTRUCTION PREFETCH THROTTLING USING INSTRUCTION COUNT AND BRANCH PREDICTION

(71) Applicant: ARM LIMITED, Cambridge (GB)

(72) Inventor: Peter Richard Greenhalgh, Cambridge (GB)

(73) Assignee: ARM Limited, Cambridge (GB)

( * ) Notice: Subject to any disclaimer, the term of this patent is extended or adjusted under 35 U.S.C. 154(b) by 304 days.

(21) Appl. No.: 14/301,991

(22) Filed: Jun. 11, 2014

(65) Prior Publication Data

US 2014/0372736 A1   Dec. 18, 2014

(30) Foreign Application Priority Data

Jun. 13, 2013   (GB) .................................. 1310557.2

(51) Int. Cl.
*G06F 9/38* (2006.01)
*G06F 9/32* (2006.01)
*G06F 9/30* (2006.01)

(52) U.S. Cl.
CPC ........... *G06F 9/3806* (2013.01); *G06F 9/3804* (2013.01); *G06F 9/3869* (2013.01)

(58) Field of Classification Search
CPC ... G06F 9/3806; G06F 9/3804; G06F 9/3869
USPC ................................................ 712/238, 239
See application file for complete search history.

(56) References Cited

U.S. PATENT DOCUMENTS

| | | | | |
|---|---|---|---|---|
| 5,692,168 A * | 11/1997 | McMahan | ............. | G06F 9/3806 711/E12.018 |
| 6,560,693 B1 * | 5/2003 | Puzak | ..................... | G06F 9/383 712/205 |
| 6,564,313 B1 * | 5/2003 | Kashyap | ................. | G06F 9/381 711/137 |
| 6,704,860 B1 * | 3/2004 | Moore | ................. | G06F 9/3802 711/213 |
| 6,799,263 B1 * | 9/2004 | Morris | ................. | G06F 9/3802 711/119 |

(Continued)

FOREIGN PATENT DOCUMENTS

EP     1 050 804     11/2000

OTHER PUBLICATIONS

IBM Technical Disclosure Bulletin, "Method and Apparatus for Predicted Prefetch Suppression," Sep. 2010, 2 pages.*

(Continued)

*Primary Examiner* — Andrew Caldwell
*Assistant Examiner* — Yuqing Xiao
(74) *Attorney, Agent, or Firm* — Nixon & Vanderhye P.C.

(57) ABSTRACT

A sequence of buffered instructions includes branch instructions. Branch prediction circuitry predicts if each branch instruction will result in a taken branch when executed. Normally, the fetch circuitry retrieves speculative instructions between the time that a source branch instruction is retrieved and the prediction if that source branch instruction will result in the taken branch. If the source branch instruction is predicted as taken, then the speculative instructions are discarded, and a count value indicates a number of instructions in the sequence between that source branch instruction and a subsequent branch instruction in the sequence that is also predicted as taken. Responsive to a subsequent occurrence of the source branch instruction predicted as taken, a throttled mode limits the number of instructions subsequently retrieved dependent on the count value, and then any further instructions are not retrieved for a number of clock cycles.

20 Claims, 8 Drawing Sheets

(56) References Cited

U.S. PATENT DOCUMENTS

| | | | | |
|---|---|---|---|---|
| 6,810,466 | B2* | 10/2004 | Henry | G06F 9/30047 711/137 |
| 8,176,297 | B2* | 5/2012 | Yamamoto | G06F 9/3802 712/205 |
| 2002/0099926 | A1* | 7/2002 | Sinharoy | G06F 9/3804 712/207 |
| 2004/0268050 | A1* | 12/2004 | Cai | G06F 12/0862 711/137 |
| 2006/0271766 | A1* | 11/2006 | Vasekin | G06F 9/3802 712/207 |
| 2009/0177858 | A1* | 7/2009 | Gschwind | G06F 1/3203 711/163 |
| 2009/0210663 | A1* | 8/2009 | Sartorius | G06F 9/3804 712/207 |
| 2012/0124345 | A1 | 5/2012 | Denman et al. | |

OTHER PUBLICATIONS

Baniasadi et al., "Instruction Flow-Based Front-end Throttling for Power-Aware High-Performance Processors," International Symposium on Low Power Electronics and Design, Aug. 2001, pp. 16-21.*

Search Report for GB 1310557.2 dated Nov. 29, 2013.

J. Aragón et al., "Power-Aware Control Speculation Through Selective Throttling", Proceedings of the Ninth International Symposium on High-Performance Computer Architecture, 2003, (HPCA-9 2003), Feb. 8-12, 2003; IEEE, 5 pages.

J. Aragon et al., "Energy-Effective Instruction Fetch Unit for Wide Issue Processors", Advances in Computer Systems Architecture Lecture Notes in Computer Science; LNCS, Jan. 1, 2005, pp. 15-27.

* cited by examiner

INSTRUCTION PREFETCH THROTTLING USING INSTRUCTION COUNT AND BRANCH PREDICTION

This application claims priority to GB 1310557.2 filed 13 Jun. 2013, the entire contents of which is hereby incorporated by reference.

BACKGROUND OF THE INVENTION

1. Field of the Invention

The present invention relates to a data processing apparatus and method for handling retrieval of instructions from an instruction cache.

2. Background of the Invention

Caches are widely used in data processing systems to temporarily store instructions and/or data values for access by a processing unit. If the instruction or data value required by the processing unit is already stored in such a cache, this can significantly improve the performance of the data processing system by avoiding the need to obtain that instruction or data value from main memory at the time it is required by the processing unit. However, the performance of a cache lookup operation within a cache in order to determine whether the requested instruction or data value is within the cache consumes significant power, and in many applications it is highly desirable to reduce power consumption within the data processing system.

Often caches are arranged in an n-way set associative structure, and typically a cache lookup operation will involve performing a lookup in each of the ways of the cache. With the aim of seeking to reduce power consumption within a cache, a number of cache way prediction or cache way tracking techniques have been developed which aim to reduce the power consumption involved in a cache lookup by excluding from the lookup any of the ways that the prediction or tracking technique indicates will not store the instruction or data value being requested. By limiting the cache lookup operation to a subset of the total number of ways, this reduces power consumption.

Irrespective of whether such cache way prediction or tracking techniques are used, there is still a further power consumption issue that can arise in association with accesses made to an instruction cache, due to the way in which that instruction cache is used when fetching instructions for execution within the execution circuitry of the processing unit. In particular, the execution circuitry will execute a sequence of instructions, and that sequence of instructions will include various branch instructions. When a branch instruction is executed by the execution circuitry, this will either result in a not taken branch, as a result of which the next instruction to be executed will be the instruction at the address following the branch instruction, or will result in a taken branch, as a result of which a target address will be determined identifying the next instruction to be executed. Accordingly, when execution of a branch instruction results in a taken branch, there will be a change in instruction flow.

Fetch circuitry is typically used to request instructions from the instruction cache with the aim of obtaining a near continuous stream of instructions for issuance to the execution circuitry, in order to keep the execution circuitry fed with instructions that can be executed. Branch prediction circuitry is often used to predict, for any identified branch instructions fetched by the fetch circuitry, whether those branch instructions will or will not result in a taken branch when that branch instruction is subsequently executed by the execution circuitry. In very high performance processors where power consumption is not a significant concern, it is known to provide branch prediction circuitry very close to the instruction cache fetching mechanism, so that there is no, or only a minimal, "branch shadow", i.e. the prediction as to whether a branch instruction will result in a taken branch or not can be made within the same clock cycle that the instruction is fetched from the instruction cache. The fetch circuitry can then determine the next instruction to fetch dependent on the result of the branch prediction circuitry. However, such an arrangement consumes a large amount of power.

Accordingly, in many high performance pipelined processors, where power consumption is a significant issue, the branch prediction circuitry typically operates several pipeline stages (for example 1 to 4 pipeline stages) after a fetch from the instruction cache has been performed. During the period between which a branch instruction is fetched from the instruction cache, and that same branch instruction is analysed by the branch prediction circuitry, the fetch circuitry will typically continue to speculatively fetch instructions from sequential addresses following the branch instruction. However, if the branch prediction circuitry subsequently predicts that execution of that branch instruction will result in a taken branch, those speculative instructions that the fetch circuitry has fetched in the interim will need to be discarded. This results in a waste of instruction cache lookup power, due to the need to perform a lookup in the instruction cache for the speculative instructions, only for them subsequently to be discarded.

SUMMARY OF THE INVENTION

Viewed from a first aspect, the present invention provides a data processing apparatus comprising: fetch circuitry configured to retrieve instructions from an instruction cache into a temporary buffer; execution circuitry configured to execute a sequence of said instructions retrieved from the temporary buffer, said sequence of instructions including branch instructions; branch prediction circuitry coupled between the fetch circuitry and the execution circuitry and configured to predict, for each identified branch instruction in said sequence, if that branch instruction will result in a taken branch when that branch instruction is subsequently executed by the execution circuitry; the operation of the fetch circuitry and the branch prediction circuitry being such that in a normal operating mode the fetch circuitry is configured to retrieve one or more speculative instructions from the instruction cache between a source branch instruction being retrieved from the instruction cache and the branch prediction circuitry predicting if said source branch instruction will result in said taken branch, in the event that said taken branch is predicted for said source branch instruction, said one or more speculative instructions being discarded; throttle prediction circuitry configured to maintain, in the event that said taken branch is predicted for said source branch instruction, a count value indicative of a number of instructions appearing in said sequence between said source branch instruction and a subsequent branch instruction in said sequence that the branch prediction circuitry also predicts will result in said taken branch; and the throttle prediction circuitry being configured, responsive to a subsequent occurrence of said source branch instruction in said sequence that the branch prediction circuitry predicts will result in said taken branch, to operate said fetch circuitry in a throttled mode where the number of instructions subsequently retrieved by the fetch circuitry from the instruction cache is limited dependent on said count value, and then said fetch circuitry is prevented from retrieving any further instructions from the instruction cache for a predetermined number of clock cycles.

In accordance with the present invention, throttle prediction circuitry is provided that maintains a count value indicative of how many instructions appear in the sequence between branch instructions that are predicted as taken by the branch prediction circuitry. Hence, when the branch prediction circuitry predicts a taken branch in respect of a first branch instruction (referred to herein as a source branch instruction), the throttle prediction circuitry maintains an indication of the number of instructions then appearing in the sequence between that source branch instruction and a subsequent branch instruction that the branch prediction circuitry also predicts as taken. That subsequent branch instruction can be any branch instruction, and hence could be the same branch instruction as the source branch instruction (for the example where a loop is being repeated and each iteration is triggered by the source branch instruction), or could be a different branch instruction (such as in nested loops, etc).

Once a count value has been determined indicative of the number of instructions appearing in the sequence between the source branch instruction and the next branch instruction predicted as taken, then when a subsequent occurrence of the source branch instruction is identified in the sequence, and if the branch prediction circuitry predicts that occurrence as resulting in a taken branch, the throttle prediction circuitry operates the fetch circuitry in a throttled mode. In the throttled mode, only a limited number of instructions will be fetched by the fetch circuitry, that number being dependent on the count value, and then the fetch circuitry will be prevented from retrieving any further instructions from the instruction cache for a predetermined number of clock cycles.

By such an approach, it is possible for the fetch circuitry to continue to retrieve instructions up to the point where it is expected that the next branch instruction will be encountered. Fetching is then inhibited for a predetermined number of clock cycles, to allow time for the instruction(s) retrieved by the final fetch of the fetch circuitry (before fetching was inhibited) to be reviewed by the branch prediction circuitry. If that final fetch contained an instruction that is in fact a branch instruction that is predicted to result in a taken branch, the fetch circuitry will not have wasted power consumption by instigating unnecessary accesses to the instruction cache for speculative instructions that will then need to be discarded. If in contrast that final fetch contained an instruction that is determined to be a branch instruction that is predicted as not taken, or indeed does not contain a branch instruction at all, the fetch circuitry can merely be caused to resume instruction fetching in the usual manner, just resulting in a small interruption in the fetching of instructions due to the fetch circuitry having been throttled for a predetermined number of clock cycles from performing fetching.

It has been found that such a technique provides an efficient mechanism for reducing the fetching of unwanted instructions, and hence saving the associated power consumption that would be associated with instruction cache lookups in relation to those unwanted instructions. Whilst in one embodiment the fetch circuitry may be arranged to retrieve a single instruction at a time from the instruction cache, and similarly the execution circuitry may be arranged to request a single instruction at a time from the temporary buffer, in an alternative embodiment the fetch circuitry may retrieve during each fetch a block of instruction bits representing a plurality of instructions, and similarly the execution circuitry may, for each request, receive such a block of instruction bits (i.e. multiple instructions will be the subject of each request). In such embodiments, the count value maintained by the throttle prediction circuitry is still indicative of the number of instructions appearing in the sequence between the source branch instruction and a subsequent branch instruction predicted as taken, but in one embodiment the count value will be expressed in terms of the number of requests for instruction blocks between the request containing the source branch instruction predicted as taken and the request containing the subsequent branch instruction predicted as taken. This count value will then subsequently be used by the throttle prediction circuitry to limit the number of fetches performed by the fetch circuitry for instruction blocks.

In one embodiment, the fetch circuitry is configured to initiate retrieval of each instruction from the instruction cache in a first pipeline stage, said branch prediction circuitry is configured to operate in a further pipeline stage, and the predetermined number of clock cycles is determined dependent on the number of pipeline stages between said first pipeline stage and said further pipeline stage.

In one embodiment, once the fetch circuitry has been prevented from retrieving any further instructions from the instruction cache for said predetermined number of clock cycles, the fetch circuitry is configured to return to the normal operating mode. At this point, if the last instruction fetch of the fetch circuitry prior to the throttling taking place contained a branch instruction that was predicted as taken, the branch prediction circuitry will have provided an indication of a target address from which the fetch circuitry should begin to continue fetching instructions. Conversely, if that final instruction fetch contained a branch instruction that is predicted as not taken, or did not contain a branch instruction at all, the fetch circuitry can merely resume fetching from the next address in the sequence.

The throttle prediction circuitry can take a variety of forms, but in one embodiment comprises a throttle prediction table comprising a plurality of entries, each entry being configured, when allocated to a source branch instruction, to store an associated count value for that source branch instruction. Hence, through use of the throttle prediction table, the throttle prediction circuitry can keep a plurality of different count values, each associated with a different source branch instruction.

There are a number of ways in which the entries in the throttle prediction table can be used. In one embodiment, each source branch instruction has an associated instruction address, and the throttle prediction circuitry comprises allocation circuitry configured to determine an entry to allocate to each source branch instruction dependent on a first portion of the associated instruction address.

In one particular embodiment, the throttle prediction table is configured as an n-way set associative storage and the allocation circuitry is configured when allocating an entry to a source branch instruction to determine, dependent on the first portion of the associated instruction address, at least one candidate entry in each way of the n-way set associative storage, and to select as the allocated entry one of said candidate entries. Hence, through such an arrangement of throttle prediction table, there will be a plurality of possible entries that can be used for any particular source branch instruction based on its associated instruction address. When deciding amongst the various candidate entries which one to use as the allocated entry for a current source branch instruction, any of a number of known allocation policies can be used, for example pseudo-random, round-robin, least recently used, etc.

In one embodiment, the first portion of the associated instruction address used to identify the candidate entries is such that there will be various different source branch instructions that will point to the same set of candidate entries. To enable a subsequent cache lookup procedure to identify whether the count value stored in the entry actually relates to the specific branch instruction being considered, in one embodiment the allocation circuitry is further configured to store within the allocated entry for a source branch instruction an address identifier derived from the associated instruction address of that source branch instruction. Hence, when a subsequent lookup operation identifies a particular set of entries, the address identifiers stored in each of those entries can be compared with the address identifier derived from the instruction address of the branch instruction under consideration in order to determine whether there is a hit in the throttle prediction table for that branch instruction.

In many practical implementations, a particular branch instruction can be encountered many times during execution of a sequence of instructions by the execution circuitry, for example due to the branch instruction being used to implement a loop within the instruction flow. Often nested loops will appear within the instruction flow, and in such situations it can be the case that a particular branch instruction results in a taken branch for a certain number of iterations, and then results in a not taken branch for at least one iteration, and then later may again result in a series of taken branches. It is often the case that a data processing apparatus will maintain a branch history storage that, for a series of branch instructions within the sequence of instructions executed by the execution circuitry, identifies a history of branch taken and branch not taken decisions made by the execution circuitry. In one embodiment, this is used to disambiguate addresses when performing allocation and lookup operations within the throttle prediction table, in essence allowing a single source branch instruction to have entries in two different sets within the n-way set associative storage. In particular, in one embodiment, the allocation circuitry is configured to apply a hash function using the first portion of the associated instruction address and the history from the branch history storage as inputs, in order to generate an output used to identify said at least one candidate entry in each way of the n-way set associative storage.

By such an approach, it is possible to further improve the accuracy with regard to the count value in situations where the instruction sequence contains branches that fluctuate between taken and not taken. For example, considering a particular source branch instruction, it may be the case that the next branch instruction in the sequence is taken some of the time (resulting in a count value of m being identified for that source branch instruction) whereas in other instances that following branch instruction is not taken, and hence the subsequent branch instruction that the branch prediction circuitry predicts as being taken will be later in the instruction sequence. In that case, a separate entry for the source branch instruction can be provided identifying a count value of n, where n is greater than m. The patterns within the branch history can then be used in association with the address to identify the appropriate entry to be considered at any particular point in time.

In one embodiment, the throttle prediction circuitry comprises lookup circuitry configured to be responsive to said branch prediction circuitry predicting said taken branch for a current branch instruction being reviewed by the branch prediction circuitry, to perform a lookup operation in said throttle prediction table to determine if said current branch instruction matches one of the source branch instructions having an allocated entry in said throttle prediction table, and in the event of said match the throttle prediction circuitry being configured to cause said fetch circuitry to be operated in said throttled mode using the count value stored in said allocated entry for the matching source branch instruction.

In one embodiment, wherever there is a hit in the throttle prediction table, the throttle prediction circuitry will automatically cause the fetch circuitry to be operated in the throttled mode. However, in an alternative embodiment, a strength value is maintained by the throttle prediction circuitry to act as a qualifier for the throttled mode. In particular, in one embodiment, each entry in said throttle prediction table further comprises a strength value maintained by the throttle prediction circuitry, and the throttle prediction circuitry is responsive to detection of said match by the lookup circuitry to reference the strength value stored in the allocated entry for the matching source branch instruction in order to determine whether the fetch circuitry is to be operated in said throttled mode. Hence, such an approach can be used to ensure that multiple hits in the throttle prediction table are required before throttling is actually allowed to take place. This ensures that the system does not adversely affect performance in respect of branches that move between taken and not taken.

In one embodiment, when an entry is first allocated for a source branch instruction the throttle prediction circuitry is configured to set the strength value within that entry to an initial value which will prevent the fetch circuitry being operated in the throttled mode, the throttle prediction circuitry being configured to vary the strength value stored in that entry dependent on subsequent matches being detected by the lookup circuitry in respect of the source branch instruction allocated to that entry. In particular, in one embodiment, when a hit is subsequently detected in respect of an entry, it is checked whether the count value accurately identifies the next branch instruction that is predicted as taken by the branch prediction circuitry, and only in that instance is the strength value modified. Hence, some level of assurance that the count value is accurate is achieved before the throttled mode is activated, and if for a particular source branch instruction the subsequent branch instruction oscillates between taken and not taken, causing the count value to be accurate sometimes and not accurate at other times, then this can cause the strength value to be held at a value which prevents the throttled mode from being used.

There are a number of ways in which the throttle prediction circuitry can cause the fetch circuitry to not fetch any further instructions for the predetermined number of clock cycles when in the throttled mode. In one embodiment, the throttle prediction circuitry comprises throttle signal generation circuitry configured to be responsive to said throttle prediction circuitry determining that the fetch circuitry should be operated in said throttled mode, to receive the count value from the relevant entry in the throttle prediction table and to track the number of instructions subsequently retrieved by the fetch circuitry in order to assert a throttle signal to the fetch circuitry for said predetermined number of clock cycles when the number of retrieved instructions indicated by said count value has been reached. In one embodiment, the throttle signal generation circuitry can maintain a counter to keep track of the number of instructions subsequently retrieved by the fetch circuitry, and to then match the value held by that counter with the count value provided by the hit entry in the throttle prediction table.

As mentioned earlier, in one embodiment a block of instruction data representing multiple instructions may be fetched at a time. In that instance the throttle signal generation circuitry tracks the number of instructions subsequently retrieved by actually tracking the number of fetches performed, and the count value will typically relate to the number of fetches rather than directly identifying the number of instructions.

In one embodiment, the throttle prediction circuitry further comprises count circuitry configured to be activated following detection of said match by the lookup circuitry, to maintain an output count value indicative of the number of instructions subsequently output in said sequence from the temporary buffer after activation of said count circuitry. The throttle prediction circuitry is then responsive to the branch prediction circuitry predicting said taken branch for a first branch instruction appearing in said sequence following activation of the count circuitry, to determine whether the current output count value matches said count value stored in the relevant entry of the throttle prediction table (i.e. the entry that caused the match to be detected by the lookup circuitry). By such an approach, the throttle prediction circuitry is able to monitor whether the count value that it stores in the entry is accurate or not. In embodiments where a block of instruction data representing multiple instructions is output from the temporary buffer, the count circuitry can be configured to maintain an output count value indicative of the number of instructions subsequently output in the sequence by keeping track of the number of blocks of instruction data output, and similarly the count value stored in the entry of the throttle prediction table can be expressed in terms of the number of blocks of instruction data.

In one particular embodiment, in the event that the current output count value does not match the count value stored in the entry of the throttle prediction table causing the match to be detected by the lookup circuitry, the throttle prediction circuitry is configured to update the count value stored in said entry of throttle prediction table. Hence, the count value stored in any particular entry of the throttle prediction table can be updated over time.

In one embodiment where strength values are used, then in the event that the current output count value does match the count value stored in the entry of the throttle prediction table causing the match to be detected by the lookup circuitry, the throttle prediction circuitry is configured to adjust in a first direction the strength value stored in that entry of the throttle prediction table. Further, in the event that the current output count value does not match the count value stored in the entry of the throttle prediction table causing the match to be detected by the lookup circuitry, the throttle prediction circuitry is configured to adjust, in a second direction opposite to said first direction, the strength value stored in that entry of the throttle prediction table. Hence, the mechanism used to keep track of whether the count value is accurate or not can also be used to adjust the strength value so as to ensure that only in situations where the count value proves to be accurate is the strength value adjusted to a value that allows the throttled mode to be used.

In one embodiment, there will be a variety of conditions that may prevent the fetch circuitry from performing fetches from the instruction cache, irrespective of whether the throttled mode is being applied. For example, a stall condition may stall the pipeline of the data processing apparatus, including the fetch circuitry, and whilst the stall condition is present no instructions will be fetched. In one embodiment, the throttle prediction circuitry is configured to be responsive to at least one condition indicating that the fetch circuitry is currently prevented from fetching instructions, to ensure that said predetermined number of clock cycles associated with the throttled mode are implemented when said at least one condition is no longer present. Accordingly, by such an approach, it can be ensured that the predetermined number of clock cycles are applied once a condition such as a stall condition has passed, thus ensuring that the throttling is applied to prevent fetches that would otherwise fetch speculative instructions that may later need to be discarded.

Viewed from a second aspect, the present invention provides a method of handling retrieval of instructions from an instruction cache within a data processing apparatus comprising fetch circuitry for retrieving the instructions from said instruction cache into a temporary buffer, and execution circuitry for executing a sequence of said instructions retrieved from the temporary buffer, said sequence of instructions including branch instructions, the method comprising: employing branch prediction circuitry coupled between the fetch circuitry and the execution circuitry to predict, for each identified branch instruction in said sequence, if that branch instruction will result in a taken branch when that branch instruction is subsequently executed by the execution circuitry; operating the fetch circuitry and the branch prediction circuitry in a normal operating mode where the fetch circuitry retrieves one or more speculative instructions from the instruction cache between a source branch instruction being retrieved from the instruction cache and the branch prediction circuitry predicting if said source branch instruction will result in said taken branch, and in the event that said taken branch is predicted for said source branch instruction, discarding said one or more speculative instructions; maintaining, in the event that said taken branch is predicted for said source branch instruction, a count value indicative of a number of instructions appearing in said sequence between said source branch instruction and a subsequent branch instruction in said sequence that the branch prediction circuitry also predicts will result in said taken branch; and responsive to a subsequent occurrence of said source branch instruction in said sequence that the branch prediction circuitry predicts will result in said taken branch, operating said fetch circuitry in a throttled mode where the number of instructions subsequently retrieved by the fetch circuitry from the instruction cache is limited dependent on said count value, and then said fetch circuitry is prevented from retrieving any further instructions from the instruction cache for a predetermined number of clock cycles.

Viewed from a third aspect, the present invention provides a data processing apparatus comprising: fetch means for retrieving instructions from an instruction cache into a temporary buffer; execution means for executing a sequence of said instructions retrieved from the temporary buffer, said sequence of instructions including branch instructions; branch prediction means, coupled between the fetch means and the execution means, for predicting, for each identified branch instruction in said sequence, if that branch instruction will result in a taken branch when that branch instruction is subsequently executed by the execution means; the operation of the fetch means and the branch prediction means being such that in a normal operating mode the fetch means retrieves one or more speculative instructions from the instruction cache between a source branch instruction being retrieved from the instruction cache and the branch prediction means predicting if said source branch instruction will result in said taken branch, in the event that said taken branch is predicted for said source branch instruction, said one or more speculative instructions being discarded; throttle prediction means for maintaining, in the event that said taken branch is predicted for said source branch instruction, a count value indicative of a number of instructions appearing in said sequence between said source branch instruction and a subsequent branch instruction in said sequence that the branch prediction means also predicts will result in said taken branch; and the throttle prediction means, responsive to a subsequent occurrence of said source branch instruction in said sequence that the branch prediction means predicts will result in said taken branch, for operating said fetch means in a throttled mode where the number of instructions subsequently retrieved by the fetch means from the instruction cache is limited dependent on said count value, and then said fetch means is prevented from retrieving any further instructions from the instruction cache for a predetermined number of clock cycles.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

In the following description of embodiments, for the purposes of simplicity it is assumed (unless otherwise stated) that the instruction fetch width for instructions fetched from the instruction cache, and the request width for instructions output from the fetch queue to the execution circuitry, correspond with the width of a single instruction, and accordingly one instruction is the subject of each fetch and each request. However, as mentioned earlier, in alternative embodiments the fetch width or request width may identify a number of instruction bits corresponding to multiple instructions, and in those embodiments the same basic techniques can be used, with the count values maintained by the throttle prediction circuitry typically identifying the number of fetches/requests rather than directly identifying the number of instructions.

Figure 1:
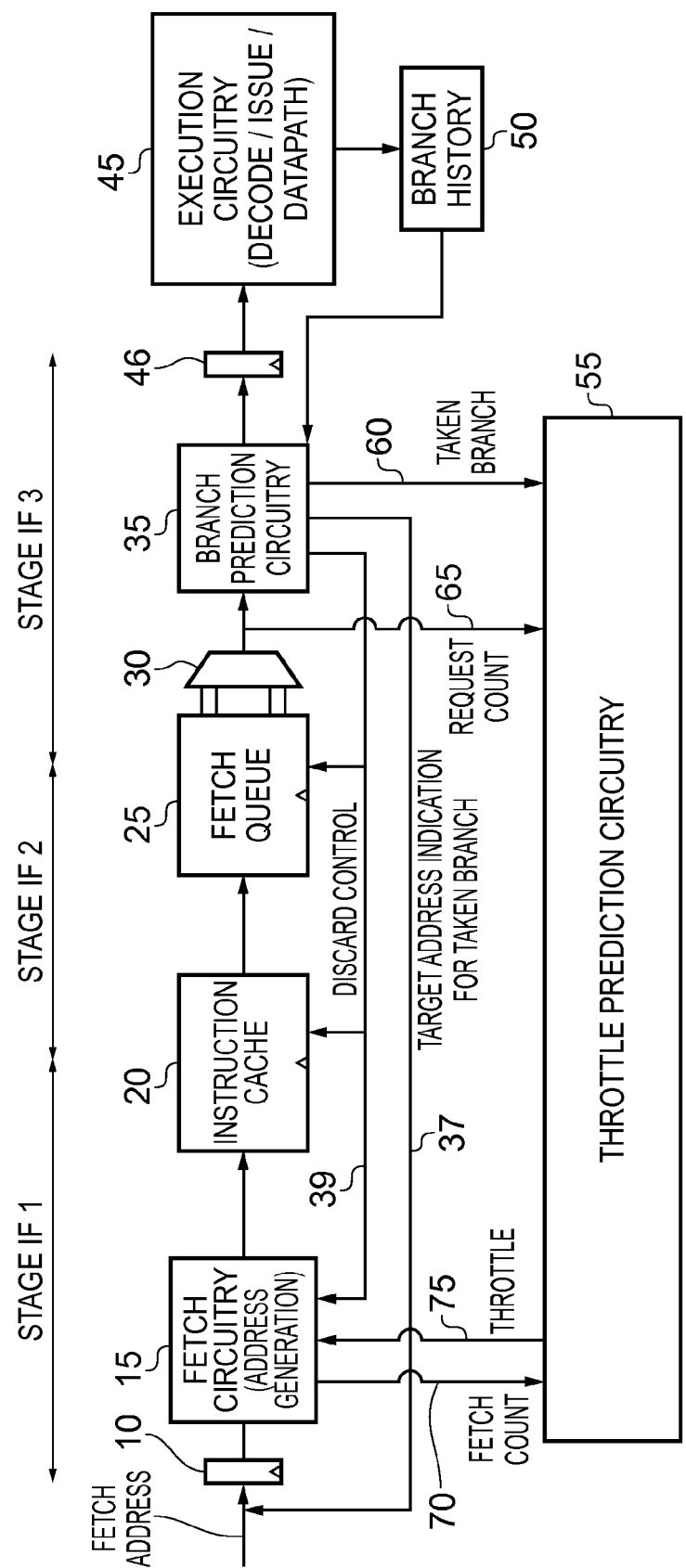
FIG. 1 is a block diagram of a data processing apparatus in accordance with the first embodiment.

FIG. 1 is a block diagram of a data processing apparatus in accordance with one embodiment. The execution circuitry 45 is arranged to execute a sequence of instructions. Typically the execution circuitry will be constructed as a plurality of pipeline stages, and includes a decode stage, an issue stage and one or more execute stages including data path units used to perform the required data processing operations specified by the instructions.

In order to provide the sequence of instructions to be executed by the execution circuitry, various components as shown in FIG. 1 are provided for fetching the instructions from memory, with the aim of providing a steady stream of instructions for execution by the execution circuitry 45. As shown in FIG. 1, these various components occupy a plurality of pipeline stages, in this particular instance three pipeline stages referred to as instruction fetch (IF) stages 1, 2 and 3.

The fetch circuitry 15 is configured to receive one or more items of address information from the registers 10. During normal operation, a fetch address will be provided to the register 10, typically derived from the program counter value maintained by the processing unit. The fetch circuitry then generates a memory address and outputs that address to the instruction cache 20 causing a lookup to be performed within the instruction cache to identify whether the instruction at that memory address is stored within the instruction cache. If the instruction is found within the instruction cache, then in the next cycle that instruction data is output to the fetch queue 25 in pipeline stage IF 2. If instead the instruction is not found in the cache, then the instruction cache will seek to obtain the required instruction from memory, which will incur a number of cycles of delay, but will ultimately result in the instruction being returned and routed via the instruction cache into the fetch queue 25. By default, the fetch circuitry 15 will aim to fetch instructions from sequential memory addresses with the aim of maintaining a sufficient volume of instructions in the fetch queue to ensure that there is a steady stream of instructions to route to the execution circuitry 45.

The sequence of instructions to be executed by the execution circuitry 45 will typically include a number of branch instructions. When a branch instruction is executed by the execution circuitry, it may result in a taken branch being determined, where the instruction flow then jumps to a new memory address (referred to as the target address of the branch instruction). As will be understood, there are a number of ways for determining the target address for a branch instruction, for example offset data may be provided within the branch instruction itself, identifying an offset to be applied to the current fetch address in order to determine the new target address, or alternatively the branch instruction may identify a register whose contents will provide information required to identify the target address. Whilst in some instances execution of the branch instruction will result in a taken branch, in other instances execution of the branch instruction may result in a not taken branch. If a branch is not taken, then then the instruction flow merely proceeds sequentially to the next instruction address.

By virtue of the default activity of the fetch circuitry discussed above, it will be appreciated that when a branch instruction is not taken, the instructions subsequently retrieved into the fetch queue 25 will be the required instructions for the execution circuitry to execute. However, if the branch instruction is taken, this will not be the case, and typically a different series of instructions will need to be fetched by the fetch circuitry. This could result in a significant performance impact on the data processing unit.

With the aim of seeking to reduce such a performance impact, branch prediction circuitry 35 is provided in a pipeline stage IF 3 to review any identified branch instructions in the sequence of instructions output from the fetch queue 25 via the multiplexer 30 for routing into the register 46, and from there into the execution circuitry 45. The branch prediction circuitry 35 may itself be arranged to identify the branch instructions within the sequence of instructions output from the fetch queue, or alternatively some separate circuitry may be used to identify the branch instructions and route them via the branch prediction circuitry 35. For example, some partial decode circuitry could be provided for determining from the opcode of each instruction whether it is a branch instruction, and for passing any branch instructions to the branch prediction circuitry 35 for review.

As will be well understood by those skilled in the art, the branch prediction circuitry is used to predict for each branch instruction, whether the branch will be taken or not taken when that branch instruction is subsequently executed by the execution circuitry 45. Some branch instructions will be unconditional, and accordingly will always be taken. However, other branch instructions may be conditional, and accordingly may be taken or not taken dependent on certain specified conditions. As will be understood, there are various known techniques for operating the branch prediction circuitry to predict whether a branch instruction will be taken or not taken. As shown in FIG. 1, one item of information which can be input to the branch prediction circuitry 35 for use in the branch prediction process is the output of a branch history 50 maintained by the execution circuitry 45. In particular, the branch history maintains the taken/not taken decisions made for a particular series of branch instructions executed by the execution circuitry, typically the most recently executed N branch instructions), and hence provides a pattern of taken and not taken decisions made by the execution circuitry.

If the branch prediction circuitry 35 predicts that a current branch instruction being reviewed will be taken, then it outputs over path 37 a target address indication for the taken branch, in one embodiment that target address indication taking the form of an offset value. That offset value is then provided along with the fetch address information to the fetch circuitry 15, enabling the fetch circuitry to identify a next instruction that will be required by the execution circuitry, assuming the execution circuitry does indeed take the branch when that branch instruction is subsequently executed.

However, due to the pipelined nature of the instruction fetch circuitry shown in FIG. 1, it will be appreciated that in the period between the fetch circuitry having fetched a particular branch instruction, and that particular branch instruction being reviewed by the branch prediction circuitry 35, the fetch circuitry will have continued to have fetched a number of further instructions from sequential memory addresses, these instructions being referred to herein as speculative instructions. For example, if one instruction is fetched every clock cycle, it will be seen that two further instructions will be fetched by the time the branch prediction circuitry 35 is analysing the branch instruction. If the branch instruction is predicted as taken, those two instructions need to be discarded, and appropriate discard control signals will be issued over path 39 to the elements 15, 20, 25 to ensure that those instructions are discarded. If the fetch circuitry is configured to fetch multiple instructions every clock cycle, it will be appreciated that the number of speculative instructions fetched during those two cycles will be larger, and hence there will potentially be more instructions to be discarded.

Accesses to the instruction cache 20 typically consume significant power, and accordingly having to discard one or more instructions that have been fetched via the instruction cache, in the event that the branch prediction circuitry predicts a branch instruction as taken, can waste significant power consumption. In particular, the power consumed in accessing the instruction cache for those speculative instructions is "wasted", since those instructions are later determined not to be required. To seek to reduce such wasted power consumption, the data processing apparatus of the embodiment of FIG. 1 includes throttle prediction circuitry 55.

As will be discussed in more detail later with reference to FIG. 2, the throttle prediction circuitry 55 receives over path 60 information about branch instructions that branch prediction circuitry 35 predicts as taken, and via path 65 seeks to maintain a count of the number of instructions that are output from the fetch queue 25 between each branch instruction predicted as taken. That count information can then be used to throttle the subsequent behaviour of the fetch circuitry 15 via asserting at an appropriate point a throttle signal over path 75. To decide when to assert the throttle signal, the throttle prediction circuitry 55 also receives fetch count information over path 70 from the fetch circuitry indicative of the number of instructions being fetched by the fetch circuitry.

Purely by way of example, if a first branch instruction is predicted as taken, and then the sixth subsequent instruction output from the fetch queue is the next branch instruction that is also predicted as taken, the throttle prediction circuitry 55 can keep a count value of six in association with the first branch instruction. When that first branch instruction is subsequently encountered again in the instruction stream, then in one embodiment the throttle prediction circuitry 55 begins to monitor the fetch count information over path 70 from the fetch circuitry. Once six instructions have been fetched, it asserts the throttle signal for a predetermined number of cycles to prevent the fetch circuitry from fetching any further instructions whilst the throttle signal is asserted. With the three stage pipeline of FIG. 1, the throttle signal will be asserted for two clock cycles. Assuming the sixth instruction fetched by the fetch circuitry turns out to be the next branch instruction as expected, and is again predicted as taken, the branch prediction circuitry can output the target address indication for that next branch instruction over path 37, whereafter the fetch circuitry can then resume fetching from the new target address. At this point, the throttle signal will be de-asserted, since by the time the branch prediction circuitry has analysed that sixth instruction (the next branch instruction), two clock cycles will have passed. Further, in that instance, it will be appreciated that there will be no instructions to be discarded, since the fetch circuitry will not have fetched any further instructions in the time period between the sixth (next branch) instruction having been fetched by the fetch circuitry and that sixth instruction having been analysed by the branch prediction circuitry.

If instead it turns out that the sixth instruction fetched was not the next branch instruction, or was the next branch instruction, but on this occasion that next branch instruction is predicted as not taken, then the fetch circuitry can merely resume fetching from the next consecutive memory address, and only a slight break in the instruction fetching activity will have been incurred by virtue of the throttle signal having been asserted for two clock cycles. It has been found that that slight break in the fetching activity is more than outweighed by the significant reduction in power consumption achieved by not performing instruction cache accesses for instructions that will subsequently be discarded when branch instructions are predicted as taken.

If the fetch circuitry 15 is actually configured to fetch two instructions at a time, and similarly the fetch queue 25 outputs two instructions at a time, then for the above specific example the count value will instead be stored as three instead of six. Once three fetches have been performed, the throttle signal will be asserted for two cycles. In this instance, if the sixth instruction turns out to be the next branch instruction as expected, and is again predicted as taken, the use of the throttle signal will prevent fetching of four instructions during those two cycles.

It should be noted that the same mechanism will be used, and the same count value maintained, in situations where it is the fifth instruction that is the next branch instruction. In that instance, if the fifth instruction is predicted as taken, it will be necessary to discard the sixth instruction that will have been fetched at the same time as the fifth instruction. However, through use of the throttled mode, the fetching of four further speculative instructions will have been avoided.

Figure 2:
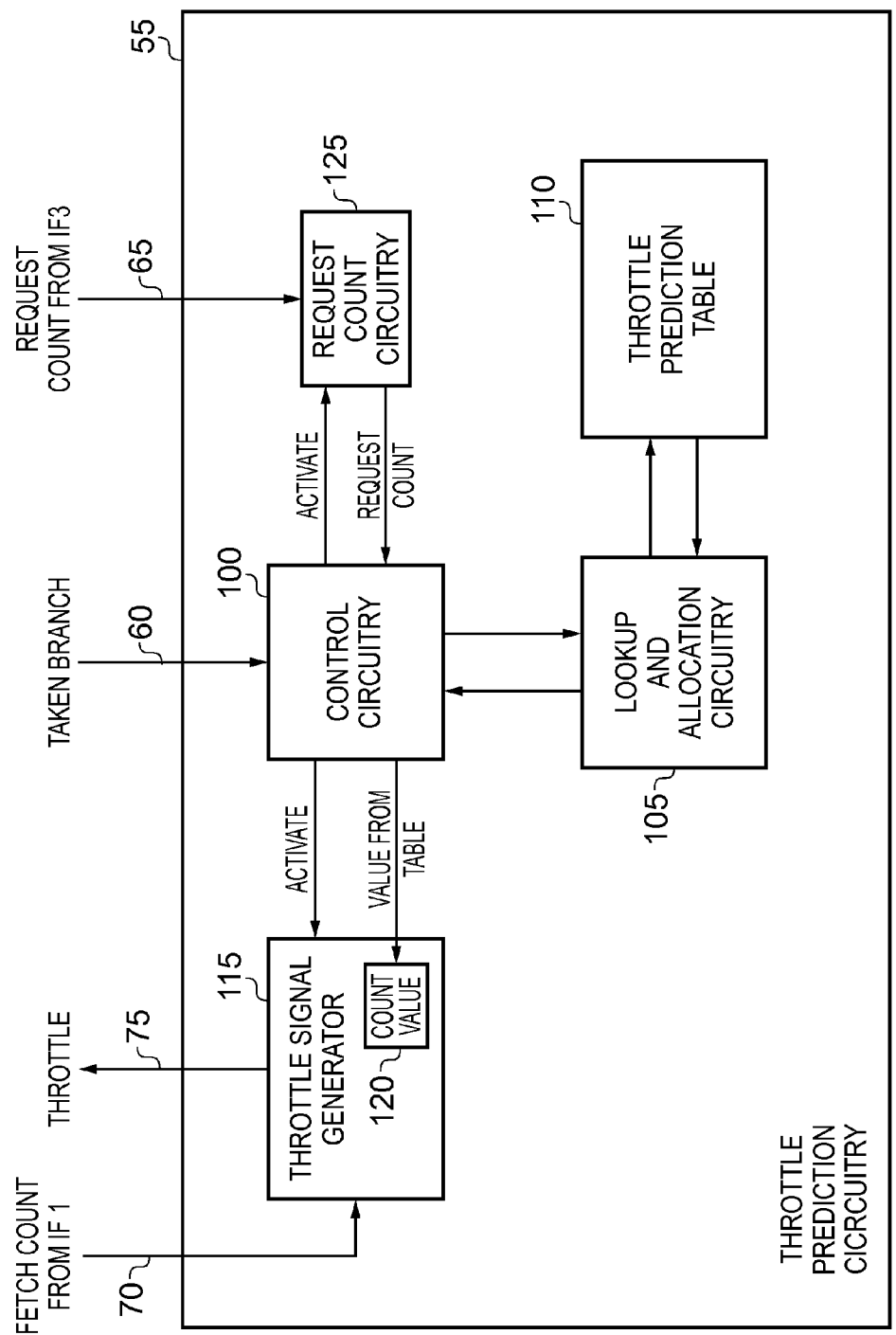
FIG. 2 is a block diagram illustrating in more detail the throttle prediction circuitry of FIG. 1 in accordance with one embodiment.

FIG. 2 is a block diagram schematically illustrating the components provided within the throttle prediction circuitry 55 in accordance with one embodiment. Control circuitry 100 is used to coordinate the activities of the other components within the throttle prediction circuitry, and is arranged to receive the taken branch information over path 60 from the branch prediction circuitry 35. Whenever a taken branch is observed, the control circuitry 100 will cause the lookup and allocation circuitry 105 to perform a lookup within the throttle prediction table 110, the throttle prediction table having a plurality of entries, each entry being allocatable to a particular branch instruction that has been predicted as taken, and maintaining a count value in association with that particular branch instruction. If the lookup process indicates a hit condition, i.e. indicates that one of the entries already stores a count value for the branch instruction that is currently being predicted as taken, then that count value can be provided to the count value register 120 within the throttle signal generator 115, and the throttle signal generator can be triggered to begin counting the fetches performed by the fetch circuitry, and once those number of fetches matches the count value, to then assert the throttle signal for a predetermined number of clock cycles.

Conversely, if the lookup operation indicates that there is a miss condition, i.e. there is not currently an entry for the current branch instruction that has been predicted as taken, then an allocation process can be performed to allocate an entry in the throttle prediction table for that branch instruction. During this process, the request count circuitry 125 can be activated to keep track of the number of instructions output from the fetch queue 25, this quantity being referred to herein as a request count. When the next taken branch is observed over path 60, the control circuitry will then cause the current request count value held by the request count circuitry 125 to be stored in the allocated entry of the throttle prediction table as the count value to be associated with the previously predicted branch instruction.

Figure 3A:
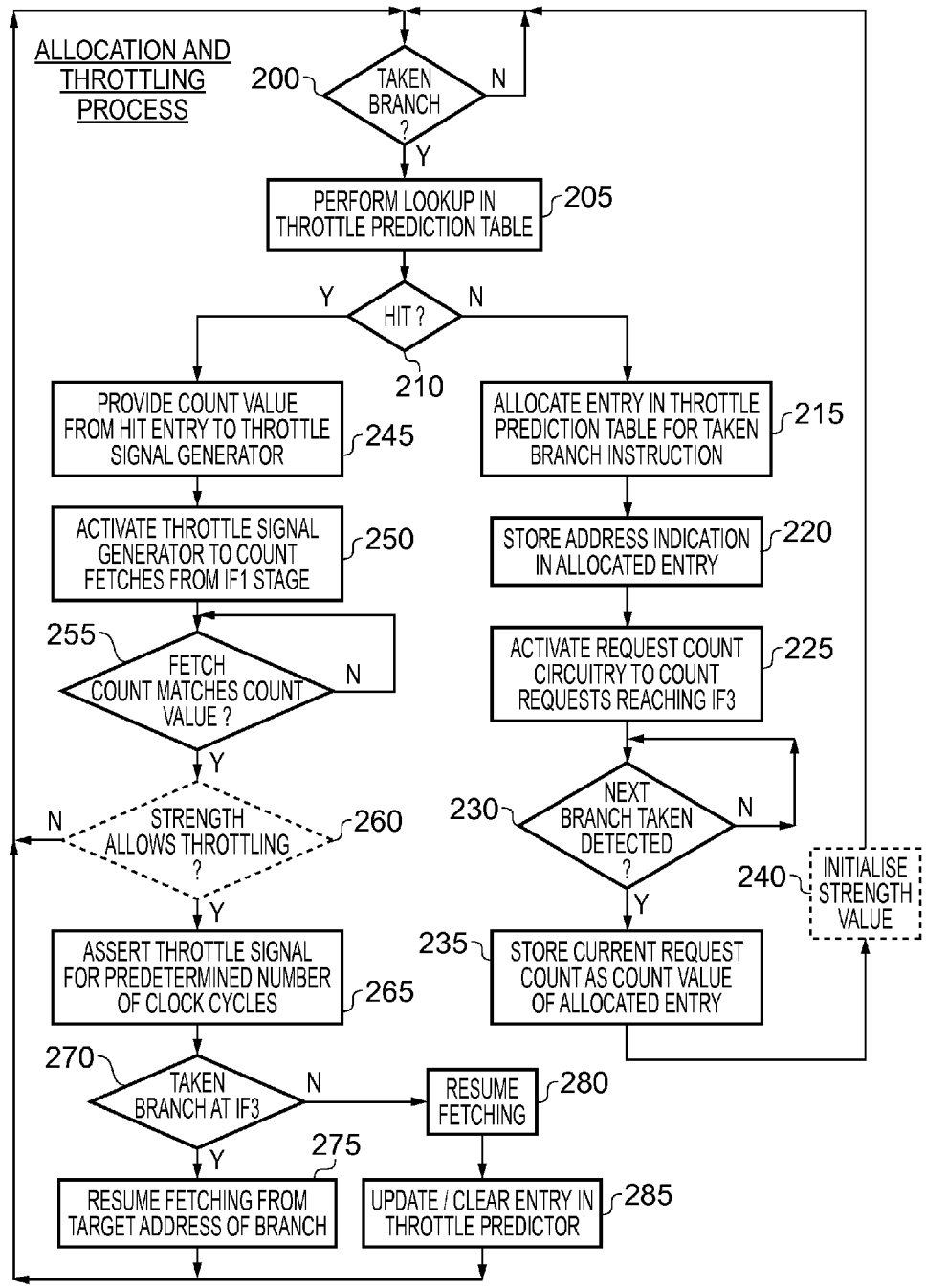
FIG. 3A is a flow diagram illustrating the operation of the throttle prediction circuitry in accordance with one embodiment.

FIG. 3A is a flow diagram illustrating in more detail the operation of the throttle prediction circuitry of FIG. 2. At step 200, the control circuitry 100 determines whether a taken branch has been observed over path 60. Once such a taken branch is observed, then at step 205 the control circuitry causes the lookup and allocation circuitry 105 to perform a lookup in the throttle prediction table 110 based on the memory address of the taken branch that was observed. It is then determined at step 210 whether there is a hit in the throttle prediction table.

If not, the process proceeds to step 215, where an entry is allocated in the throttle prediction table for the taken branch instruction. Any suitable allocation policy can be used to identify the entry to be allocated in the throttle prediction table. In one embodiment, the throttle prediction table is arranged as an n-way set associative structure, and hence for any particular branch instruction memory address, there will be at least one entry in each way that can be allocated to that branch instruction. Which entry is actually allocated is a matter of design choice, for example the entry within that set of entries may be selected pseudo-randomly, on a round-robin basis, on a least recently used basis, etc.

Following step 215, an address indication is stored in the allocated entry. In one particular embodiment, this address indication takes the form of at least a partial tag portion of the branch instruction memory address, which can then be used later to determine whether a hit condition exists for that entry for a subsequently encountered branch instruction that is predicted as taken. It should be noted that, depending on how the throttle prediction table is structured, there may be no need to explicitly store an address indication. For example, in a direct mapped arrangement there may be one specific entry in the throttle prediction table that can be allocated for a specific memory address, and hence the address indication will be implicit.

Following step 220, the process proceeds to step 225, where the request count circuitry 125 is activated to count the instructions (also referred to herein as requests) reaching stage IF 3, i.e. to keep count of the instructions output from the fetch queue 25 following the branch instruction that was predicted as taken at step 200. The request count circuitry continues to keep count of the instructions output from the fetch queue until the control circuitry 100 observes the next branch taken indication over path 60, indicating that the branch prediction circuitry 35 has encountered a further branch instruction that it predicts as taken. Once that next branch taken indication is observed at step 230, the control circuitry 100 causes the current request count maintained by the request count circuitry 125 to be stored as the count value in the allocated entry at step 235.

As will be discussed in more detail with reference to FIG. 4, in one embodiment each entry can optionally store a strength value which can be used to determine whether throttling of the fetch circuitry should or should not be performed. In such an embodiment, following step 235, the strength value will be initialised at step 240, whereafter the allocated entry is fully populated and ready to be subjected to subsequent lookup operations. Accordingly, the process returns to step 200. Alternatively, in embodiments where no strength value is maintained, the process returns directly to step 200 following step 235.

If a hit is detected at step 210, then the process proceeds to step 245, where the current count value held in the hit entry is passed to the throttle signal generator 115. Thereafter, the throttle signal generator is activated at step 250 to count the fetches from the IF 1 stage, this information being received by the throttle signal generator over path 70 from the fetch circuitry 15. At step 255, it is determined whether the fetch count matches the count value, and when it does, the process proceeds to step 265. As shown in FIG. 3A, in embodiments where a strength value is maintained, then the process does not proceed directly from step 255 to step 265, but instead at step 260 it is determined whether the current strength value allows the throttling to take place. If not, the process merely returns to step 200, but assuming the strength value does allow throttling, or in embodiments where no strength value is used, the process proceeds to step 265 where the throttle signal is asserted by the throttle signal generator 115 over path 75 for a predetermined number of clock cycles. As discussed earlier, in the example of FIG. 1, this will typically be two clock cycles.

Following that predetermined number of clock cycles, the last instruction that was fetched by the fetch circuitry before the throttling took place should have reached the branch prediction circuitry stage IF 3. It is accordingly then determined at step 270 whether a taken branch is observed at stage IF 3 at this point. If it is, then all that is required at step 275 is for the fetch circuitry 15 to begin fetching of instructions from the target address of the branch instruction that is predicted as taken at step 270. No instructions will need to be discarded within the preceding stages IF 1 or IF 2, since the fetch circuitry will not have performed any fetching into those stages due to the asserted throttle signal.

If in contrast a taken branch is not observed at stage IF 3 at step 270, then the fetch circuitry can merely resume fetching at step 280 from the next consecutive memory address. Further, at step 285, the entry in the throttle predictor table that produced the hit at step 210 can either be updated or cleared. In particular, if a taken branch was not observed at stage IF 3 at step 270, this means that the current count value in that entry does not accurately reflect the location of the next branch instruction to be predicted as taken, and hence in one embodiment the control circuitry 100 can continue to monitor the taken branch information over path 60 to identify where in fact the next branch instruction appears that is predicted as taken, and then update the throttle prediction table accordingly, or can decide to invalidate the entry.

Figure 3B:
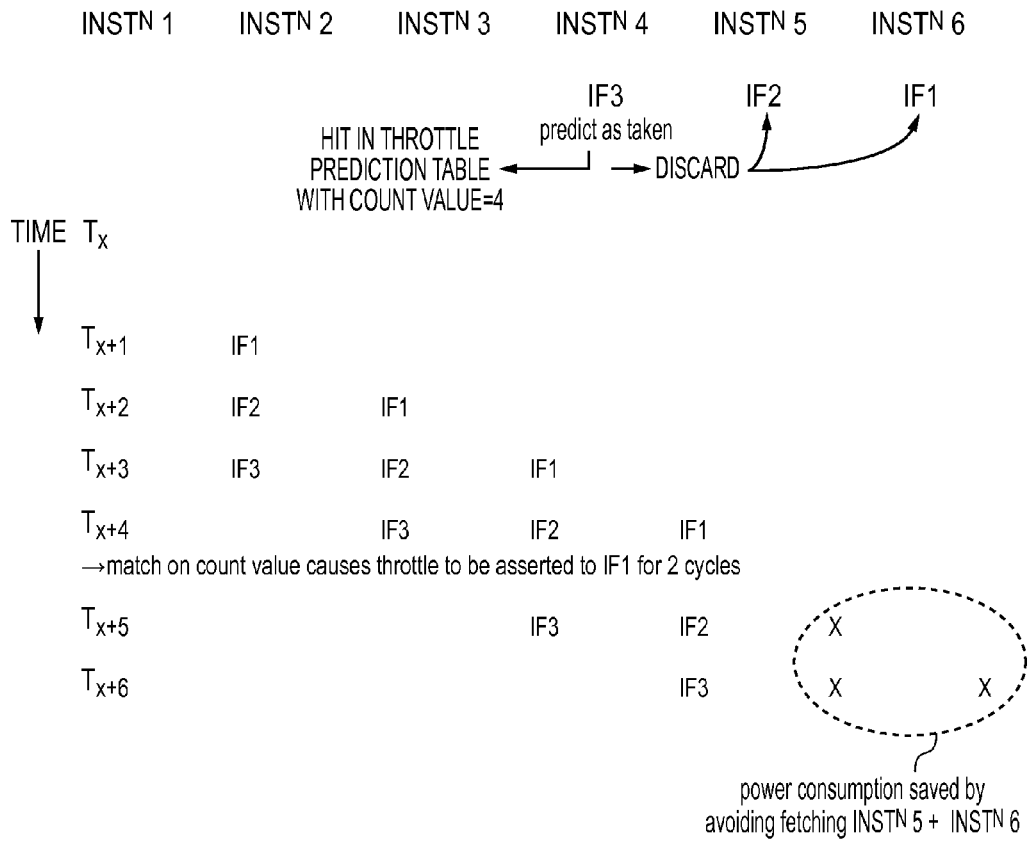
FIG. 3B illustrates an example of how the throttled mode may be used in one embodiment to reduce power consumption associated with instruction cache accesses.

FIG. 3B schematically illustrates the power consumption benefits that can be achieved when using the above described throttle prediction circuitry for a simple scenario where a sequence of instructions are executed, but instruction 4 is a branch instruction which for a predetermined number of iterations (in this particular example 16 iterations) causes the instruction flow to return to instruction 1 (hence implementing a loop through instructions 1 to 4 sixteen times. In this example it is assumed for ease of illustration that one instruction is fetched per fetch operation. At time $T_x$ it is assumed that instruction 4 is at stage IF 3, instruction 5 is at stage IF 2 and instruction 6 is at stage IF 1, i.e. the fetch circuitry is merely fetching sequentially instructions at this point. It is also assumed that an entry in the throttle prediction table has now been allocated for instruction 4, and this is the first instance where a hit for instruction 4 will be identified in the throttle prediction table. It is also assumed that a count value of 4 is stored in association with that entry. At this point, instructions 5 and 6 need to be discarded in the standard manner, and accordingly the branch prediction circuitry 35 will issue the relevant discard controls signal over path 39. It will also issue a target address over path 37 to cause the fetch circuitry to begin fetching from instruction 1. Accordingly, at time $T_{x+1}$, instruction 1 will be in the IF 1 stage. Similarly, at time $T_{x+2}$, instruction 1 will move to the IF 2 stage and instruction 2 will move into the IF 1 stage. At time $T_{x+3}$, instruction 1 will move into the IF 3 stage, instruction 2 will move into the IF 2 stage and instruction 3 will move into the IF 1 stage. At time $T_{x+4}$, instruction 2 will move into the IF 3 stage, instruction 3 will move into the IF 2 stage and instruction 4 will move into the IF 1 stage.

At this point, the throttle signal generator 115 will identify that the fetch stage has fetched four instructions, that this matches the count value of four, and accordingly will assert the throttle signal over path 75 for two cycles. This means that at times $T_{x+5}$ and $T_{x+6}$, no further fetching takes place and instead instructions 3 and 4 merely move through the remaining instruction fetch stages. At time $T_{x+6}$, it can be seen that instruction 4 (the branch instruction) is now at the branch prediction stage IF 3. If that branch instruction is again predicted as taken, the branch prediction circuitry will merely issue the required target address indication over path 37, and at time $T_{x+7}$ (where the throttle signal will no longer be asserted), the fetch circuitry can merely begin to fetch from that target address. As indicated by the "X" indications associated with instructions 5 and 6 at times $T_{x+5}$ and $T_{x+6}$, the power consumption that would otherwise have been incurred by accessing the instruction cache for instructions 5 and 6, only for them to then be discarded, will have been avoided, and no discard control signal needs issuing over path 39.

Figure 4:
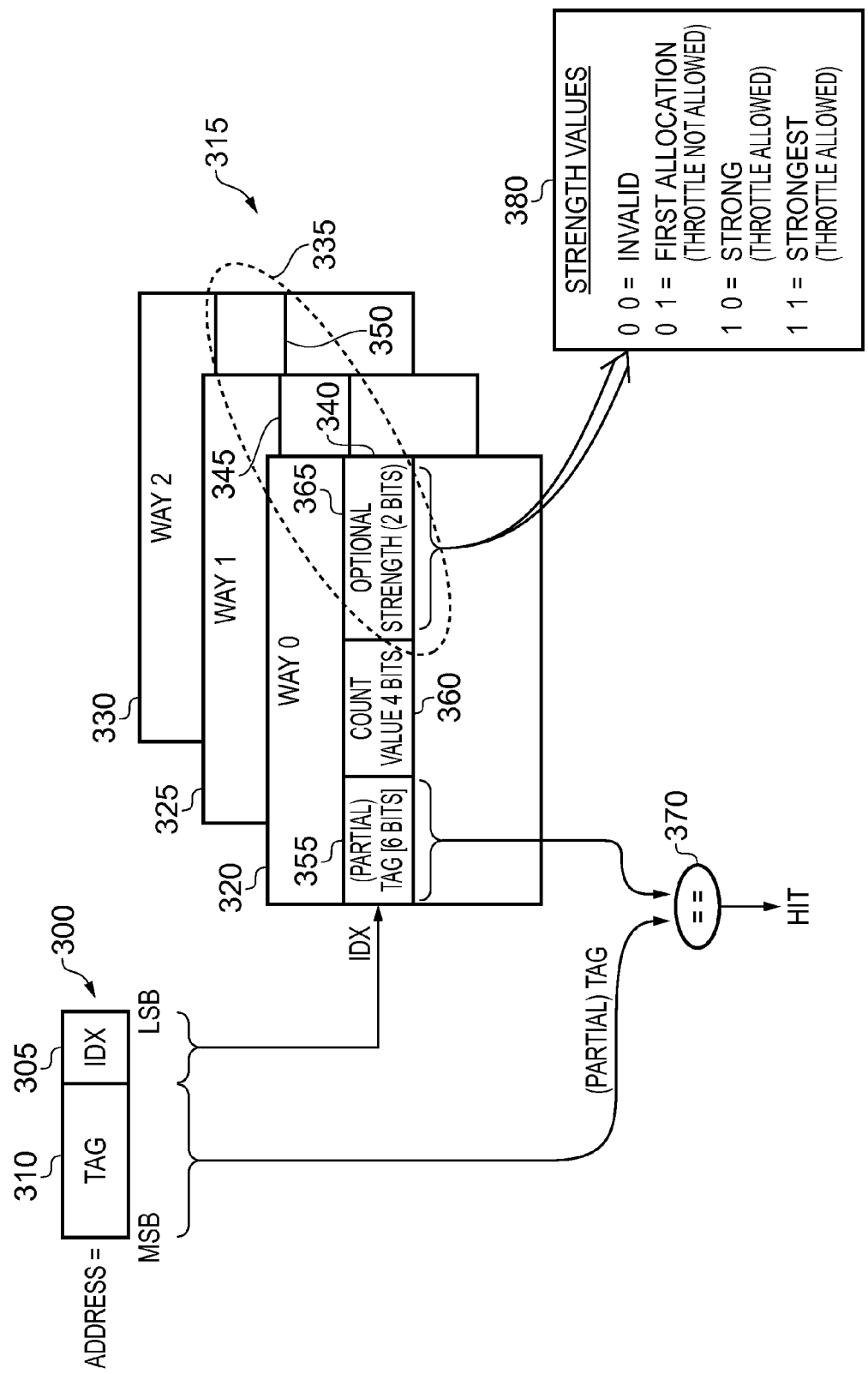
FIG. 4 illustrates the throttle prediction table of FIG. 2 in accordance with one embodiment.

FIG. 4 illustrates the throttle prediction table 110 in accordance with one embodiment. In this embodiment, the throttle prediction table is arranged as an n-way set associative structure, in this particular instance a three-way set associative structure. An index portion 305 of a branch instruction address 300 is used to identify a particular entry in each way 320, 325, 330 of the table, the three entries 340, 345, 350 forming a set 335. Each entry stores a partial tag value 355, a count value 360 and optionally a strength value 365. In this particular example the partial tag occupies six bits, the count value occupies four bits and the strength value occupies two bits, but it will be appreciated that the exact number of bits allocated to each of these items can be varied dependent on implementation.

When performing a lookup operation, the partial tag information 355 stored in each of the entries 340, 345, 350 identified by the index portion 305 of the address is then compared with the corresponding partial tag information of the address 300 using comparison circuitry 370. If the partial tag in any of those three entries matches the partial tag of the address, then a hit condition is detected.

As shown by box 380 in FIG. 4, the strength value can be used to identify whether the entry is valid, and if it is valid, whether throttling is permitted or not. When an entry is first allocated, the strength value will be set to the first allocation value (in this example "01") which means that when a hit is subsequently detected for that entry, it will not be allowed to cause throttling of the fetch circuitry. However, if following that hit, it is then determined in due course that the count value in the hit entry did correctly identify the location of the next branch instruction predicted is taken, then the strength value can be incremented (in this example to the value "10"). Thereafter, the next time a hit is detected on that entry, the count value will actually be used to cause throttling of the fetch circuitry to take place.

In one embodiment, the strength value is allowed to increment further up to a value "11". Once the strength value has reached this strongest setting, then even if following a subsequent hit it is determined that the next branch instruction predicted as taken was not at the location identified by the count value (for example because in that particular instance the next branch instruction was predicted as not taken for that particular occurrence), then the strength value can be decremented back down to "10", but can still be used to cause throttling. Hence, an occasional blip in the accuracy of the count value would not stop it from continuing to be used as the basis for performing throttling of the fetch circuitry.

Figure 5:
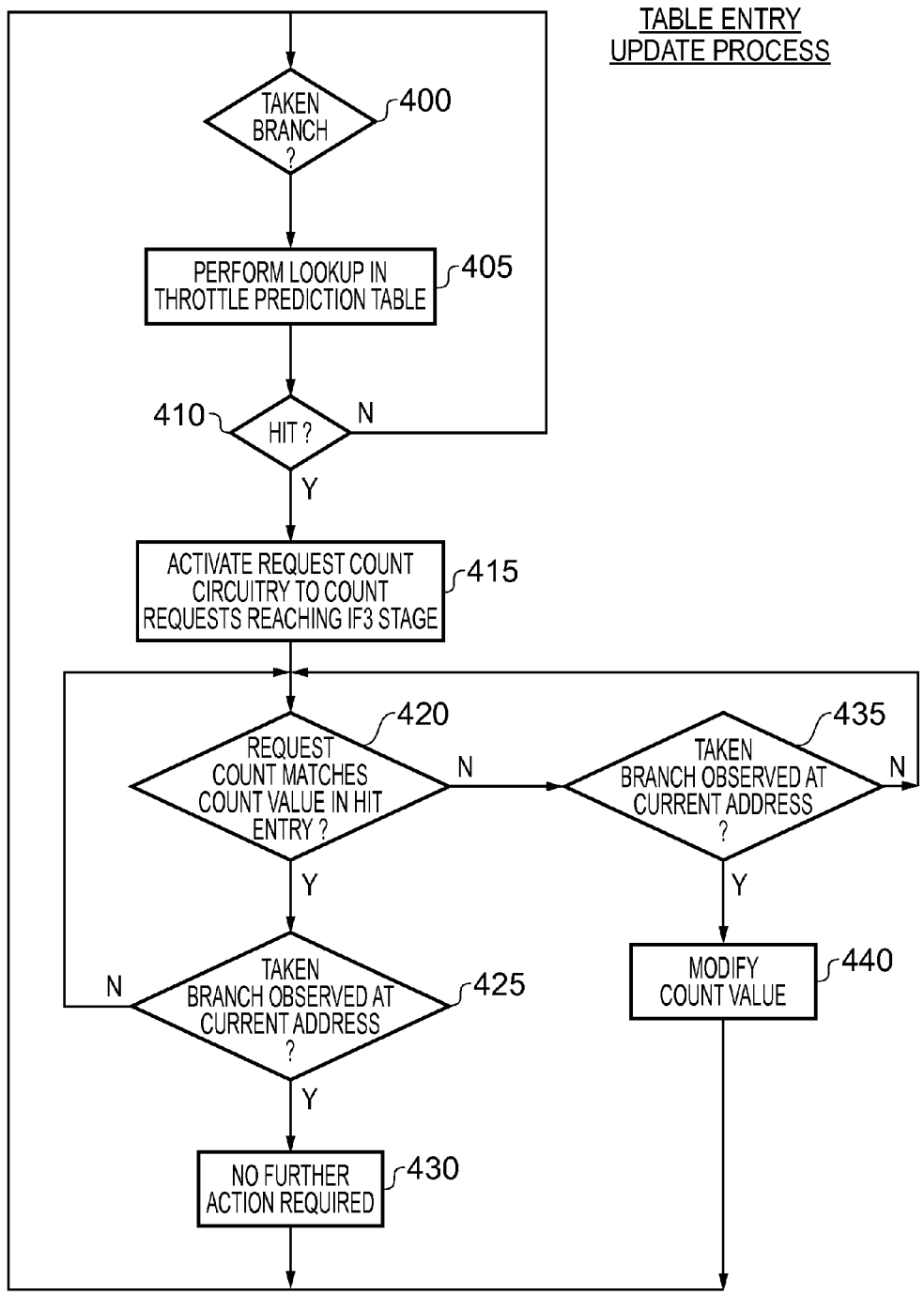
FIG. 5 is a flow diagram illustrating how entries in the throttle prediction table may be updated in accordance with one embodiment.

In one embodiment, the throttle prediction circuitry performs a table entry update process to allow the count value stored in a particular entry to be updated over time. FIG. 5 illustrates this process in accordance with one embodiment. If the control circuitry 100 observes a taken branch over path 60 at step 400, then it causes the lookup and allocation circuitry 105 to perform a lookup in the throttle prediction table at step 405, whereafter at step 410 it is determined whether a hit was detected in the throttle prediction table.

If not, then the process returns to step 400, but if a hit is detected, the process proceeds to step 415, where the request count circuitry 125 is activated to count the instruction requests reaching stage IF 3, i.e. the number of instructions output from the fetch queue 25.

At step 420, it is determined whether the current request count maintained by the request count circuitry 125 matches the count value in the hit entry, and if so the process proceeds to step 425, where it is determined whether a taken branch is observed at the current instruction address that has reached stage IF 3. If it is, then this is the expected activity given the count value, and at step 430 no further action is deemed necessary with regard to the contents of the hit entry. Accordingly, the process returns to step 400. However, if a taken branch is not observed at the current address at step 425, the process returns to step 420. At this point, the request count will no longer match the count value in the hit entry, and the process will proceed to step 435, just as it would in any instance where the request count does not match the count value in the hit entry. At step 435, it is determined whether a taken branch is observed at the current instruction address of the instruction that has reached stage IF 3, and if not, the process returns to step 420. At some point a taken branch will be observed, and this will be detected at step 435, causing the count value to be updated at step 440.

In this embodiment, it is assumed that the throttle prediction circuitry does not actively invalidate entries in the throttle prediction table, until they need to be invalidated in order to provide room to allocate an entry for a new branch instruction that has been predicted as taken. Hence, the entries will remain valid until they are selected by the allocation circuitry as a victim entry whose contents are to be overwritten by a newly allocated branch instruction.

Figure 6:
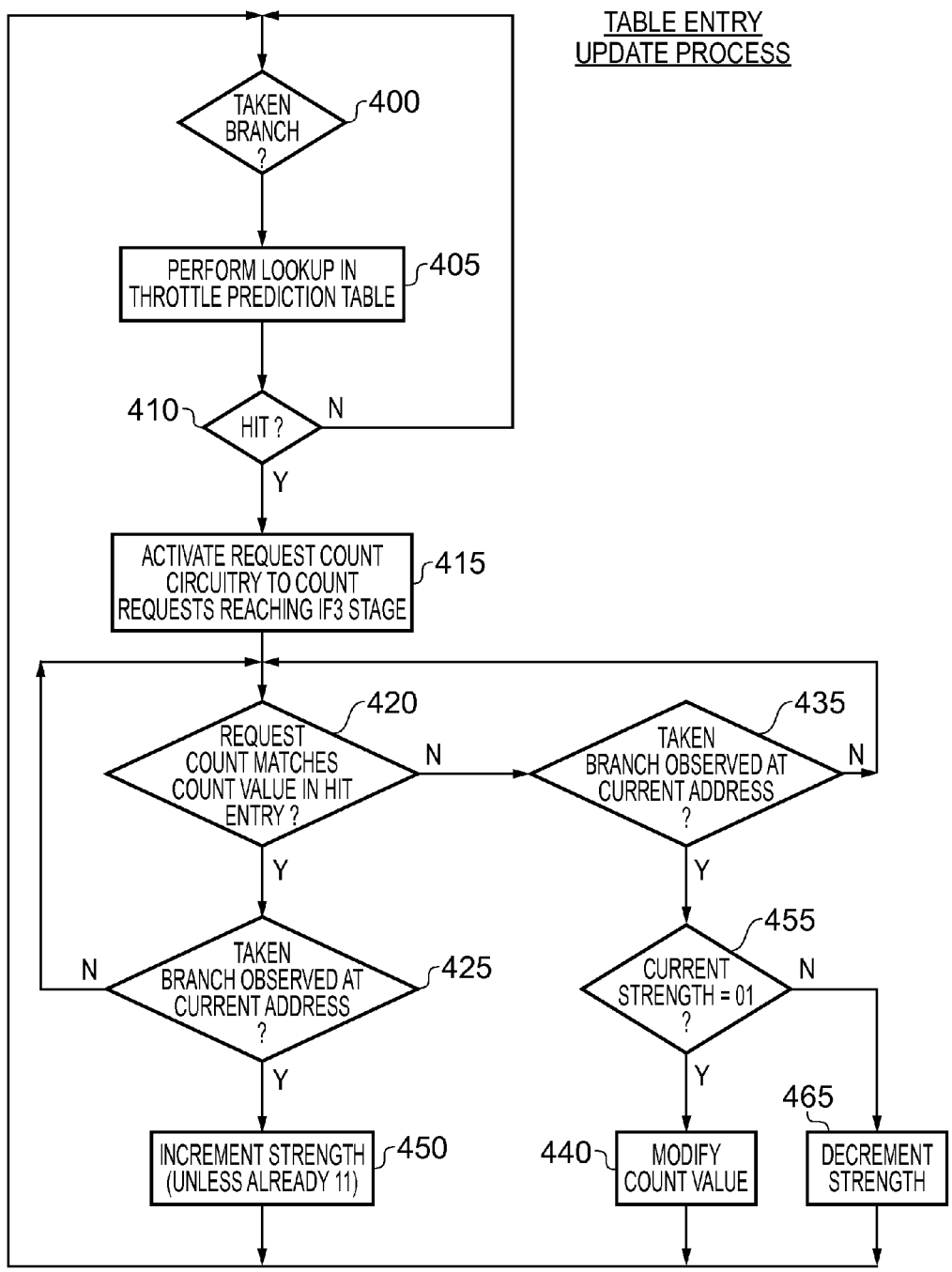
FIG. 6 is a flow diagram illustrating how entries in the throttle prediction table may be updated in accordance with an alternative embodiment.

FIG. 6 is a similar flow diagram to FIG. 5, but relates to an embodiment where the entries in the throttle prediction table also maintain strength values. Those steps which are identical to FIG. 5 are marked with the same reference numerals. As shown in FIG. 6, if at step 425 it is determined that a taken branch is observed at the current address being reviewed at step IF 3, i.e. the currently stored count value accurately identifies the next taken branch instruction, then the process proceeds to step 450 where the strength value is incremented, unless it is already at the maximum value.

If the next taken branch is not at the place it is expected, then eventually the taken branch will be observed at step 435, causing the process to branch to step 455. At this point, it will be determined whether the current strength value is at the initialised value ("01") and if not, the process will proceed to step 465 where the strength is decremented. However, no modification of the count value will take place at this point. However, if the current strength value is already at the initialised value 01, then no adjustment to the strength value will be made, but instead the count value will be modified at step 440.

As with the process of FIG. 5, the table entry update process will not itself ever invalidate an entry, but instead the allocation circuitry 105 can invalidate entries as and when it considers appropriate.

Figure 7:
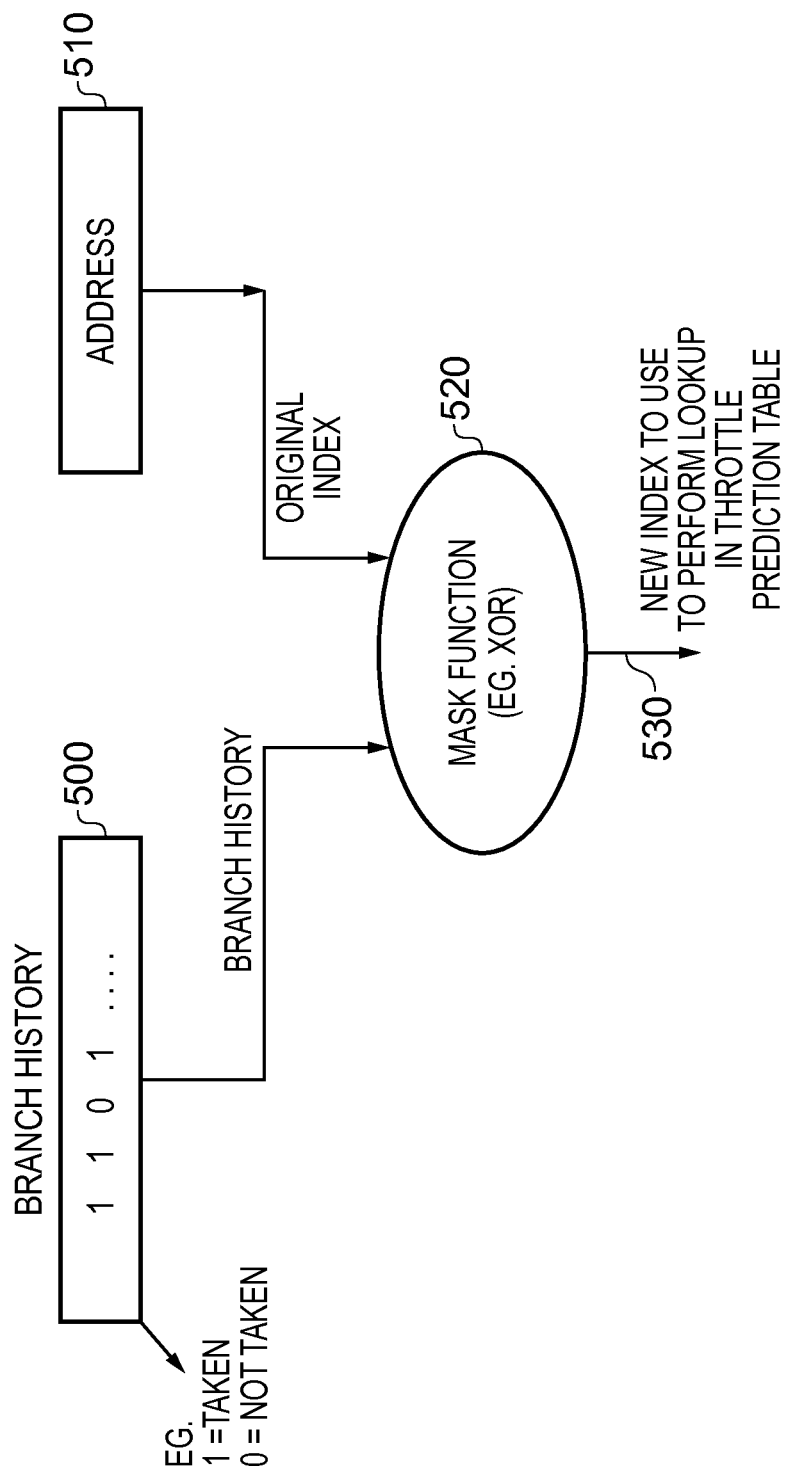
FIG. 7 illustrates how a branch instruction address may be combined with branch history information in order to generate an index into the branch prediction table in accordance with one embodiment.

Returning to FIG. 4, it will be appreciated that where the index portion 305 of an address is used directly to identify a particular set within the throttle prediction table, there will only ever be one set that is applicable to a particular address. However, in one embodiment as shown in FIG. 7, in order to disambiguate addresses and provide further accuracy on branches that fluctuate between taken and not taken, a hash function 520 may be used to generate the index output over path 530 and used by the allocation and lookup circuitry 105 to access the throttle prediction table. In particular, the hash function can receive the address 510, and in particular the original index portion of that address, and in addition can receive the branch history 500. By performing a hash function, such as a logical XOR operation on these two inputs, this means that the actual form of the index can be varied dependent on the branch history. If by way of example we consider a first, source, branch instruction, which is followed by a second branch instruction four cycles later and a third branch instruction six cycles later (i.e. two cycles after the second branch instruction), then it may be the case that the second branch instruction is taken 80% of the time, but 20% of the time is not taken. For the 80% of the time that the second branch instruction is taken, then associating a count value of 4 with the first, source, branch instruction is accurate. However, for the 20% of the time when the second branch instruction is not taken, it would be more accurate to associate a count value of 6 with the first, source, branch instruction (assuming that the third branch instruction will be predicted as taken in these instances). By merging the branch history information with the address when generating the index, it is possible to effectively allocate two separate entries for the first, source, branch instruction, one containing the count value 4 and the other containing the count value 6. This hence enables the throttle prediction table to provide an appropriate hit entry for the first, source, branch instruction at any particular point in time, even when the second branch instruction may fluctuate between being predicted as taken and predicted as not taken.

From the above described embodiments, it will be appreciated that the throttle prediction circuitry provides an effective mechanism for reducing the power consumption associated with instruction cache accesses, by seeking to avoid accessing the instruction cache to fetch speculative instructions that will later be discarded on the occurrence of a taken branch instruction.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A data processing apparatus comprising:
   fetch circuitry configured to retrieve instructions from an instruction cache into a temporary buffer;
   execution circuitry configured to execute a sequence of said instructions retrieved from the temporary buffer, said sequence of instructions including branch instructions;
   branch prediction circuitry coupled between the fetch circuitry and the execution circuitry and configured to predict, for each identified branch instruction in said sequence, if that branch instruction will result in a taken branch when that branch instruction is subsequently executed by the execution circuitry;

the operation of the fetch circuitry and the branch prediction circuitry being such that in a normal operating mode the fetch circuitry is configured to retrieve one or more speculative instructions from the instruction cache between a source branch instruction being retrieved from the instruction cache and the branch prediction circuitry predicting if said source branch instruction will result in said taken branch, when said taken branch is predicted for said source branch instruction, said one or more speculative instructions being discarded;

throttle prediction circuitry configured to maintain, when said taken branch is predicted for said source branch instruction, a count value indicative of a number of instructions appearing in said sequence between said source branch instruction and a subsequent branch instruction in said sequence that the branch prediction circuitry also predicts will result in said taken branch; and the throttle prediction circuitry being configured, responsive to a subsequent occurrence of said source branch instruction in said sequence that the branch prediction circuitry predicts will result in said taken branch, to operate said fetch circuitry in a throttled mode where the number of instructions subsequently retrieved by the fetch circuitry from the instruction cache is limited dependent on said count value, and then said fetch circuitry is prevented from retrieving any further instructions from the instruction cache for a predetermined number of clock cycles.

2. A data processing apparatus as claimed in claim 1, wherein said predetermined number of clock cycles is determined in order to allow a final instruction within said number of instructions subsequently retrieved by the fetch circuitry from the instruction cache to reach the branch prediction circuitry before the fetch circuitry is enabled to resume retrieval of further instructions from said instruction cache, such that when said final instruction is said subsequent branch instruction there will be no speculative instructions to be discarded.

3. A data processing apparatus as claimed in claim 1, wherein the fetch circuitry is configured to initiate retrieval of each instruction from the instruction cache in a first pipeline stage, said branch prediction circuitry is configured to operate in a further pipeline stage, and the predetermined number of clock cycles is determined dependent on the number of pipeline stages between said first pipeline stage and said further pipeline stage.

4. A data processing apparatus as claimed in claim 1, wherein once said fetch circuitry has been prevented from retrieving any further instructions from the instruction cache for said predetermined number of clock cycles, said fetch circuitry is configured to return to said normal operating mode.

5. A data processing apparatus as claimed in claim 1, wherein said throttle prediction circuitry comprises a throttle prediction table comprising a plurality of entries, each entry being configured when allocated to a source branch instruction to store an associated count value for that source branch instruction.

6. A data processing apparatus as claimed in claim 5, wherein:

each source branch instruction has an associated instruction address; and the throttle prediction circuitry comprises allocation circuitry configured to determine an entry to allocate to each source branch instruction dependent on a first portion of the associated instruction address.

7. A data processing apparatus as claimed in claim 6, wherein the throttle prediction table is configured as an n-way set associative storage and the allocation circuitry is configured when allocating an entry to a source branch instruction to determine, dependent on the first portion of the associated instruction address, at least one candidate entry in each way of the n-way set associative storage, and to select as the allocated entry one of said candidate entries.

8. A data processing apparatus as claimed in claim 7, wherein the allocation circuitry is further configured to store within the allocated entry for a source branch instruction an address identifier derived from the associated instruction address of that source branch instruction.

9. A data processing apparatus as claimed in claim 7, further comprising:

a branch history storage maintaining, for a series of branch instructions within said sequence of instructions executed by the execution circuitry, a history of branch taken and branch not taken decisions made by the execution circuitry; and the allocation circuitry is configured to apply a hash function using the first portion of the associated instruction address and said history from the branch history storage as inputs, in order to generate an output used to identify said at least one candidate entry in each way of the n-way set associative storage.

10. A data processing apparatus as claimed in claim 5, wherein the throttle prediction circuitry comprises lookup circuitry configured to be responsive to said branch prediction circuitry predicting said taken branch for a current branch instruction being reviewed by the branch prediction circuitry, to perform a lookup operation in said throttle prediction table to determine if said current branch instruction matches one of the source branch instructions having an allocated entry in said throttle prediction table, and in the event of said match the throttle prediction circuitry being configured to cause said fetch circuitry to be operated in said throttled mode using the count value stored in said allocated entry for the matching source branch instruction.

11. A data processing apparatus as claimed in claim 10, wherein each entry in said throttle prediction table further comprises a strength value maintained by the throttle prediction circuitry, and the throttle prediction circuitry is responsive to detection of said match by the lookup circuitry to reference the strength value stored in the allocated entry for the matching source branch instruction in order to determine whether said fetch circuitry is to be operated in said throttled mode.

12. A data processing apparatus as claimed in claim 11, wherein when an entry is first allocated for a source branch instruction the throttle prediction circuitry is configured to set the strength value within that entry to an initial value which will prevent said fetch circuitry being operated in said throttled mode, the throttle prediction circuitry being configured to vary said strength value stored in that entry dependent on subsequent matches being detected by the lookup circuitry in respect of the source branch instruction allocated to that entry.

13. A data processing apparatus as claimed in claim 10, wherein said throttle prediction circuitry comprises throttle signal generation circuitry configured to be responsive to said throttle prediction circuitry determining that the fetch circuitry should be operated in said throttled mode, to receive the count value from the relevant entry in the throttle prediction table and to track the number of instructions subsequently retrieved by the fetch circuitry in order to assert a throttle signal to the fetch circuitry for said predetermined number of clock cycles when the number of retrieved instructions indicated by said count value has been reached.

14. A data processing apparatus as claimed in claim 10, wherein the throttle prediction circuitry further comprising:
  count circuitry configured to be activated following detection of said match by the lookup circuitry, to maintain an output count value indicative of the number of instructions subsequently output in said sequence from the temporary buffer after activation of said count circuitry;
  the throttle prediction circuitry being responsive to said branch prediction circuitry predicting said taken branch for a first branch instruction appearing in said sequence following activation of said count circuitry, to determine whether the current output count value matches said count value stored in the entry of the throttle prediction table causing the match to be detected by the lookup circuitry.

15. A data processing apparatus as claimed in claim 14, wherein when the current output count value does not match said count value stored in the entry of the throttle prediction table causing the match to be detected by the lookup circuitry, the throttle prediction circuitry is configured to update the count value stored in said entry of throttle prediction table.

16. A data processing apparatus as claimed in claim 14, wherein:
  when an entry is first allocated for a source branch instruction the throttle prediction circuitry is configured to set the strength value within that entry to an initial value which will prevent said fetch circuitry being operated in said throttled mode, the throttle prediction circuitry being configured to vary said strength value stored in that entry dependent on subsequent matches being detected by the lookup circuitry in respect of the source branch instruction allocated to that entry;
  when the current output count value does match said count value stored in the entry of the throttle prediction table causing the match to be detected by the lookup circuitry, the throttle prediction circuitry is configured to adjust in a first direction the strength value stored in that entry of the throttle prediction table; and
  when the current output count value does not match said count value stored in the entry of the throttle prediction table causing the match to be detected by the lookup circuitry, the throttle prediction circuitry is configured to adjust, in a second direction opposite to said first direction, the strength value stored in that entry of the throttle prediction table.

17. A data processing apparatus as claimed in claim 1, wherein:
  the fetch circuitry is configured to retrieve during each fetch a block of instruction bits representing a plurality of instructions; and
  the throttle prediction circuitry is configured to maintain as the count value an indication of the number of said blocks appearing in said sequence between said source branch instruction and said subsequent branch instruction.

18. A data processing apparatus as claimed in claim 1, wherein the throttle prediction circuitry is configured to be responsive to at least one condition indicating that the fetch circuitry is currently prevented from fetching instructions, to ensure that said predetermined number of clock cycles associated with the throttled mode are implemented when said at least one condition is no longer present.

19. A method of handling retrieval of instructions from an instruction cache within a data processing apparatus comprising fetch circuitry for retrieving the instructions from said instruction cache into a temporary buffer, and execution circuitry for executing a sequence of said instructions retrieved from the temporary buffer, said sequence of instructions including branch instructions, the method comprising:
  employing branch prediction circuitry coupled between the fetch circuitry and the execution circuitry to predict, for each identified branch instruction in said sequence, if that branch instruction will result in a taken branch when that branch instruction is subsequently executed by the execution circuitry;
  operating the fetch circuitry and the branch prediction circuitry in a normal operating mode where the fetch circuitry retrieves one or more speculative instructions from the instruction cache between a source branch instruction being retrieved from the instruction cache and the branch prediction circuitry predicting if said source branch instruction will result in said taken branch, and when said taken branch is predicted for said source branch instruction, discarding said one or more speculative instructions;
  maintaining, when said taken branch is predicted for said source branch instruction, a count value indicative of a number of instructions appearing in said sequence between said source branch instruction and a subsequent branch instruction in said sequence that the branch prediction circuitry also predicts will result in said taken branch; and
  responsive to a subsequent occurrence of said source branch instruction in said sequence that the branch prediction circuitry predicts will result in said taken branch, operating said fetch circuitry in a throttled mode where the number of instructions subsequently retrieved by the fetch circuitry from the instruction cache is limited dependent on said count value, and then said fetch circuitry is prevented from retrieving any further instructions from the instruction cache for a predetermined number of clock cycles.

20. A data processing apparatus comprising:
  fetch means for retrieving instructions from an instruction cache into a temporary buffer;
  execution means for executing a sequence of said instructions retrieved from the temporary buffer, said sequence of instructions including branch instructions;
  branch prediction means, coupled between the fetch means and the execution means, for predicting, for each identified branch instruction in said sequence, if that branch instruction will result in a taken branch when that branch instruction is subsequently executed by the execution means;
  the operation of the fetch means and the branch prediction means being such that in a normal operating mode the fetch means retrieves one or more speculative instructions from the instruction cache between a source branch instruction being retrieved from the instruction cache and the branch prediction means predicting if said source branch instruction will result in said taken branch, when said taken branch is predicted for said source branch instruction, said one or more speculative instructions being discarded;

throttle prediction means for maintaining, when said taken branch is predicted for said source branch instruction, a count value indicative of a number of instructions appearing in said sequence between said source branch instruction and a subsequent branch instruction in said sequence that the branch prediction means also predicts will result in said taken branch; and the throttle prediction means, responsive to a subsequent occurrence of said source branch instruction in said sequence that the branch prediction means predicts will result in said taken branch, for operating said fetch means in a throttled mode where the number of instructions subsequently retrieved by the fetch means from the instruction cache is limited dependent on said count value, and then said fetch means is prevented from retrieving any further instructions from the instruction cache for a predetermined number of clock cycles.

* * * * *